United States Patent [19]

Guggenheim et al.

[11] Patent Number: 4,927,904

[45] Date of Patent: May 22, 1990

[54] METHOD FOR PREPARING CYCLIC POLYARYLATE OLIGOMERS

[75] Inventors: Thomas L. Guggenheim, Scotia; Sharon J. McCormick, Clifton Park; Alice M. Colley, Latham, all of N.Y.

[73] Assignee: General Electric Company, Schenectady, N.Y.

[21] Appl. No.: 364,294

[22] Filed: Jun. 12, 1989

[51] Int. Cl.$^5$ .................. C08G 63/30; C08G 63/27
[52] U.S. Cl. ............................ 528/182; 528/179
[58] Field of Search ........................ 528/179, 182

[56] References Cited

U.S. PATENT DOCUMENTS 4,757,132 7/1988 Brunelle et al. ............... 528/357
4,829,144 5/1989 Brunelle et al. ............... 528/176

Primary Examiner—Harold D. Anderson
Assistant Examiner—T. Mosley
Attorney, Agent, or Firm—William H. Pittman; James C. Davis, Jr.

[57] ABSTRACT

Cyclic polyarylate oligomer compositions are prepared by the reaction of an aromatic dicarboxylic acid halide, such as isophthaloyl chloride or terephthaloyl chloride, with a water-soluble salt of a dihydroxyaromatic compound, such as bisphenol A disodium salt. Freshly prepared solutions of the halide in an organic liquid such as methylene chloride, and of the salt in water, are simultaneously introduced into an organic liquid containing a catalytic amount of at least one quaternary ammonium salt having a single alkyl group containing about 8–20 carbon atoms and having not more than 5 additional carbon atoms. The dihydroxyaromatic compound salt is employed in the amount of at least about 3% in excess of stoichiometric.

11 Claims, No Drawings

METHOD FOR PREPARING CYCLIC POLYARYLATE OLIGOMERS

This invention relates to the preparation of cyclic polyarylate oligomers, and more particularly to an improved method which affords said oligomers in relatively high yield.

The preparation of cyclic polyester oligomers, with particular reference to polyarylates, is disclosed in U.S. Pat. No. 4,757,132. In brief, the method for their preparation involves the reaction of a di-(alkali metal) salt of a bisphenol with a dicarboxylic acid chloride under conditions of low concentration in a substantially nonpolar organic liquid, in the presence of a tertiary amine or quaternary ammonium salt as a phase transfer catalyst. The product is typically a mixture of cyclic polyarylates, having degrees of polymerization from 2 to about 7. Also present are various proportions of linear polyarylate.

While cyclic polyarylate preparation according to the aforementioned patent is simple and relatively convenient, the yields are often quite low. For example, cyclic bisphenol A isophthalates were obtained in yields from 15% to 50%. Obviously, a method for preparing these materials in higher yield is of considerable interest. Such a method is provided by the present invention.

Accordingly, the invention is a method for preparing a cyclic polyarylate oligomer composition which comprises simultaneously introducing the following into a solution in a substantially water-immiscible organic liquid of (C) a catalytic amount of at least one quaternary ammonium salt having a single alkyl group containing about 8–20 carbon atoms and having not more than 5 additional carbon atoms:

a freshly prepared solution in a substantially water-immiscible organic liquid of (A) at least one halide of an aromatic dicarboxylic acid in which the carboxy groups are not attached to adjacent carbon atoms, and a freshly prepared aqueous solution of (B) at least one water-soluble salt of a dihydroxyaromatic compound, the amount of reagent B being at least about 3% in excess of stoichiometric.

Reagent A in the method of this invention is at least one aromatic dicarboxylic acid halide (preferably chloride) characterized in that the carboxy groups are not attached to adjacent carbon atoms. Illustrative compounds of this type are terephthaloyl chloride, isophthaloyl chloride, naphthalene-1,3-dicarboxylic acid chloride and naphthalene-1,8-dicarboxylic acid chloride. Isophthaloyl chloride and terephthaloyl chloride are preferred.

Reagent B is at least one water-soluble salt of a dihydroxyaromatic compound. It is preferably an alkali metal salt, most often sodium or potassium and especially sodium. Suitable dihydroxyaromatic compounds include resorcinol, hydroquinone and various bisphenols represented by the formula

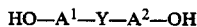

$$HO-A^1-Y-A^2-OH \qquad (I)$$

wherein each of $A^1$ and $A^2$ is a monocyclic divalent aromatic radical and Y is a single bond or a divalent bridging group. Many suitable bisphenols are listed in the aforementioned U.S. Pat. No. 4,757,132, and any of them are suitable for use; however, 2,2-bis(4-hydroxyphenyl)propane ("bisphenol A") is generally preferred by reason of its availability and relatively low cost.

Reagent C is at least one quaternary ammonium salt having a single alkyl group containing about 8–20 and preferably about 12–20 carbon atoms and having not more than 5 additional carbon atoms. It is employed as a phase transfer catalyst according to the invention. Suitable phase transfer catalysts include the higher alkyl pyridinium and trimethylammonium halides, especially chlorides and bromides, as illustrated by hexadecylpyridinium bromide, hexadecylpyridinium chloride, octylpyridinium bromide and hexadecyltrimethylammonium bromide.

Reagent A is employed in the form of a solution in a substantially water-immiscible organic liquid. Illustrative liquids are aromatic hydrocarbons such as toluene and xylene; substituted aromatic hydrocarbons such as chlorobenzene, o-dichlorobenzene and nitrobenzene; and chlorinated aliphatic hydrocarbons such as chloroform, methylene chloride, trichloroethane and tetrachloroethane. The chlorinated aliphatic hydrocarbons, especially methylene chloride, are usually preferred. Reagent B is employed in the form of an aqueous solution.

For the purposes of the present invention, it is essential that the solutions of reagents A and B be freshly prepared, since storage of said solutions leads to lower yields of cyclic polyarylates. By "freshly prepared", for the purposes of this invention, is meant solutions which have been stored not more than about two days after preparation. Preparation within about two hours before use is often preferred.

According to the invention, the solutions of reagent A and B are simultaneously introduced into a catalyst solution in the organic liquid. The amount of catalyst employed is generally about 1–5% based on reagent A, and the solution thereof generally contains about 1–5 grams of catalyst per liter of organic liquid. In terms of the proportion of reagent A with reference to total organic liquid, it is usually preferred to employ up to about 0.4 mole and especially about 0.1–0.3 mole per liter.

It is most often found that cyclic polyarylate yields are maximized if the amount of water employed to dissolve reagent B is low. Thus, a solution containing at least about 90% of the amount to provide a saturated solution is preferred, and a saturated solution is most preferred. In the case of bisphenol A disodium salt, a saturated solution is about 0.78 M.

Yields are also maximized by maintaining reagents A and B at low concentration in the reaction mixture, thus promoting intramolecular rather than intermolecular reaction. It is thus usually preferred to introduce a relatively concentrated solution of reagent A, together with the aqueous solution of reagent B, into a vessel containing a relatively large amount of organic liquid. The freshly prepared solution of reagent A preferably has a concentration of at least about 1.25 M.

The proportion of reagent B employed is at least about 3% in excess of stoichiometric; that is, at least about 3% greater than an equimolar amount with respect to reagent A. It has been discovered that the presence of such an excess improves the yield of cyclic polyarylates. It is generally not necessary to use more than about a 5% excess.

Reaction temperatures are not critical but are generally in the range of 0°–100° C., most often about 25°–100° C. An interesting feature of the present invention is that there is no apparent need to increase the temperature in order to obtain the desired cyclic polyarylates in high yields; therefore, methylene chloride may be employed as the organic liquid at temperatures below its boiling point (about 40° C.), and the cyclic products are nevertheless obtained in relatively high yield.

Following cyclic polyarylate preparation by the method of this invention, it is possible to isolate the cyclic polyarylates by conventional methods. If separation of the cyclic polyarylates from by-product linear polyarylate is desired, it may be achieved by precipitation from the organic liquid using a non-solvent such as tetrahydrofuran. In the case of bisphenol A polyarylates and especially the isophthalates, however, crystalline cyclic dimer and cyclics with degrees of polymerization above about 9 are also precipitated and lost, leaving in solution in the organic solvent only the cyclics with degrees of polymerization from 3 to about 9. For this reason, isolated yields are often substantially lower than the yields demonstrated by gel permeation chromatography. However, separation from linear polyarylate is frequently not required, and in that event the cyclic dimer and higher cyclics remain in the mixture.

The method of this invention is illustrated by the following examples.

EXAMPLE 1

Two solutions were freshly prepared: a 1.5 M solution of isophthaloyl chloride in methylene chloride, and a 0.78 M (saturated) solution of bisphenol A disodium salt in water, the latter being prepared by dissolving bisphenol A in thoroughly degassed 1.56 M aqueous sodium hydroxide solution.

These solutions were simultaneously introduced into a solution of 2 grams of octadecyltrimethylammonium chloride in 1.05 liters of methylene chloride, the addition rate of the bisphenol A salt solution being 10 ml. per minute and that of the isophthaloyl chloride solution being 5 ml. per minute. The proportion of isophthaloyl chloride was 0.3 mole per liter of total methylene chloride.

After addition was complete, the mixture was stirred for one minute and the organic phase was removed and washed three times with aqueous hydrochloric acid solution and once with water. A portion thereof was subjected to gel permeation chromatographic analysis, and the remainder was filtered through phase separation paper into an excess of tetrahydrofuran, whereupon the polymer and certain cyclics (as discussed above) precipitated and were removed by filtration. Upon stripping of the filtrate, the desired cyclic polyarylate oligomer mixture was obtained in 60% yield. The gel permeation chromatographic analysis indicated a 78% yield. For comparison, similar experiments were conducted in which the proportion of bisphenol A disodium salt was varied from a 2% stoichiometric excess to a 2% stoichiometric deficiency. The results are given in Table I.

TABLE I

| Proportion of bisphenol salt | Yield, % (isolated) |
| --- | --- |
| 3% excess | 58 |
| 2% excess | 49 |
| 1% excess | 42 |
| 1% deficiency | 26 |
| 2% deficiency | 22 |

EXAMPLE 2

The procedure of Example 1 was repeated, substituting bisphenol A dipotassium salt for the disodium salt. Similar yields were obtained.

EXAMPLE 3

The procedure differed from that of Example 1 in that a 0.75 M aqueous solution of bisphenol A disodium salt was employed, with the result being that a stoichiometric amount of bisphenol A salt was present. Thus, the method of the invention was not employed. Various phase transfer catalysts and proportions of isophthaloyl chloride relative to total methylene chloride were compared; the results given below show the effect of these parameters on product yields, and similar trends are expected according to the invention.

When employed at 1-5% with an amount of isophthaloyl chloride to provide 0.21 moles per liter of total methylene chloride, cetylpyridinium bromide and cetyltrimethylammonium bromide both afforded isolated yields on the order of 70%; at 0.3 moles of isophthaloyl chloride, the yields were 45% using cetylpyridinium bromide or chloride and 60% using cetyltrimethylammonium bromide. Other phase transfer catalysts including octyltributylammonium bromide, cetyltributylammonium bromide, distearyldimethylammonium chloride and benzyldimethylstearylammonium chloride, when employed under similar conditions, afforded yields in the range of 33-45%.

What is claimed is:

1. A method for preparing a cyclic polyarylate oligomer composition which comprises simultaneously introducing the following into a solution in a substantially water-immiscible organic liquid of (C) a catalytic amount of at least one quaternary ammonium salt having a single alkyl group containing about 8-20 carbon atoms and having not more than 5 additional carbon atoms:

a freshly prepared solution in a substantially water-immiscible organic liquid of (A) at least one halide of an aromatic dicarboxylic acid in which the carboxy groups are not attached to adjacent carbon atoms, and a freshly prepared aqueous solution of (B) at least one water-soluble salt of a dihydroxyaromatic compound, the amount of reagent B being at least about 3% in excess of stoichiometric.

2. A method according to claim 1 wherein reagent B is a salt of a compound having the formula $$HO-A^1-Y-A^2-OH \qquad (I)$$

wherein each of $A^1$ and $A^2$ is a monocyclic divalent aromatic radical and Y is a single bond or y is a divalent bridging group.

3. A method according to claim 2 wherein the organic liquid is methylene chloride.

4. A method according to claim 3 wherein reagent A is isophthaloyl chloride or terephthaloyl chloride.

5. A method according to claim 4 wherein the quaternary ammonium salt solution contains about 1-5 grams of said salt per liter of organic liquid.

6. A method according to claim 5 wherein the amount of reagent B is about 3-5% in excess of stoichiometric.

7. A method according to claim 6 wherein reagent B is a sodium salt.

8. A method according to claim 7 wherein reagent B is a salt of bisphenol A.

9. A method according to claim 8 wherein up to about 0.4 mole of reagent A is employed per liter of total organic liquid.

10. A method according to claim 9 wherein the solution of reagent A has a concentration of at least about 1.25 M.

11. A method according to claim 10 wherein the reaction temperature is from about 0° C. to the boiling point of methylene chloride.

* * * * *